United States Patent
Cui et al.

(10) Patent No.: US 11,018,903 B2
(45) Date of Patent: May 25, 2021

(54) CHANNEL ESTIMATION USING A PLURALITY OF BEAMFORMED REFERENCE SIGNALS

(71) Applicant: INTEL IP CORPORATION, Santa Clara, CA (US)

(72) Inventors: Jie Cui, Portland, OR (US); Yang Tang, San Jose, CA (US); Candy Yiu, Portland, OR (US); Daewon Lee, Portland, OR (US); Rui Huang, Beijing (CN)

(73) Assignee: Intel IP Corporation, Santa Clara, CA (US)

( * ) Notice: Subject to any disclaimer, the term of this patent is extended or adjusted under 35 U.S.C. 154(b) by 11 days.

(21) Appl. No.: 16/462,871

(22) PCT Filed: Aug. 1, 2018

(86) PCT No.: PCT/US2018/044741
§ 371 (c)(1),
(2) Date: May 21, 2019

(87) PCT Pub. No.: WO2019/028099
PCT Pub. Date: Feb. 7, 2019

(65) Prior Publication Data
US 2020/0280466 A1 Sep. 3, 2020

Related U.S. Application Data

(60) Provisional application No. 62/540,846, filed on Aug. 3, 2017.

(51) Int. Cl.
*H04L 25/02* (2006.01)
*H04B 7/06* (2006.01)

(52) U.S. Cl.
CPC ....... *H04L 25/0232* (2013.01); *H04B 7/0617* (2013.01)

(58) Field of Classification Search
CPC .. H04B 7/0617; H04B 7/0639; H04B 7/0695; H04B 7/088; H04B 7/0417;
(Continued)

(56) References Cited

U.S. PATENT DOCUMENTS 9,838,184 B2 * 12/2017 Kang .................... H04B 7/063
2018/0205443 A1 * 7/2018 Kumagai ............ H04B 7/0686
(Continued)

FOREIGN PATENT DOCUMENTS

WO 2017021915 A1 2/2017
WO 2017117424 A1 7/2017

OTHER PUBLICATIONS

PCT International Preliminary Report on Patentability in PCT International Application Serial No. PCT/US2018/044741, dated Feb. 4, 2020 (12 pages).
(Continued)

*Primary Examiner* — Khanh C Tran
(74) *Attorney, Agent, or Firm* — Alliance IP, LLC

(57) ABSTRACT

Systems and methods are provided for a network to indicate beamforming information to user equipment (UE) for identification and measurement of reference signals. For example, a network may indicate whether all the reference signals are beamformed or not, or which reference signals are using the same transmission beamforming on the time domain, the frequency domain, or both time and frequency domains. In other embodiments, a network may indicate combining or averaging information to a UE.

26 Claims, 10 Drawing Sheets

(58) Field of Classification Search
CPC .. H04B 7/0621; H04B 7/0456; H04B 7/0619; H04B 7/0628; H04B 7/0632; H04B 7/0634; H04L 5/0048; H04L 5/0051; H04L 25/0204; H04L 25/0226; H04L 25/0236; H04L 5/0053; H04L 25/0232
See application file for complete search history.

(56) References Cited

U.S. PATENT DOCUMENTS

| | | | |
|---|---|---|---|
| 2018/0279271 A1* | 9/2018 | Sadiq | H04L 5/0053 |
| 2019/0053072 A1* | 2/2019 | Kundargi | H04B 7/0814 |
| 2019/0222289 A1* | 7/2019 | John Wilson | H04B 7/0695 |
| 2020/0107341 A1* | 4/2020 | Zhang | H04W 72/042 |

OTHER PUBLICATIONS

3GPP TS 36331, "3rd Generation Partnership Project; Technical Specification Group Radio Access Network; Evolved Universal Terrestrial Radio Access (E-UTRA); Radio Resource Control (RRC); Protocol Specification (Release 15)", Mar. 2018, 786 pages.
PCT/US2018/044741, International Search Report and Written Opinion, dated Jan. 14, 2019, 20 pages.
EPO; Office Action issued in EP Patent Application No. 18755636.0, dated Nov. 2, 2020; 6 pages.
EPO; Office Action issued in EP Patent Application No. 18755636.0, dated Mar. 24, 2021; 7 pages.
Huawei, et al.; "Cell Quality Derivation from Multiple Beams,"3GPP TSG-RAN WG2#98, R2-1704877; Hangzhou, China; May 2017; 3 pages.

\* cited by examiner

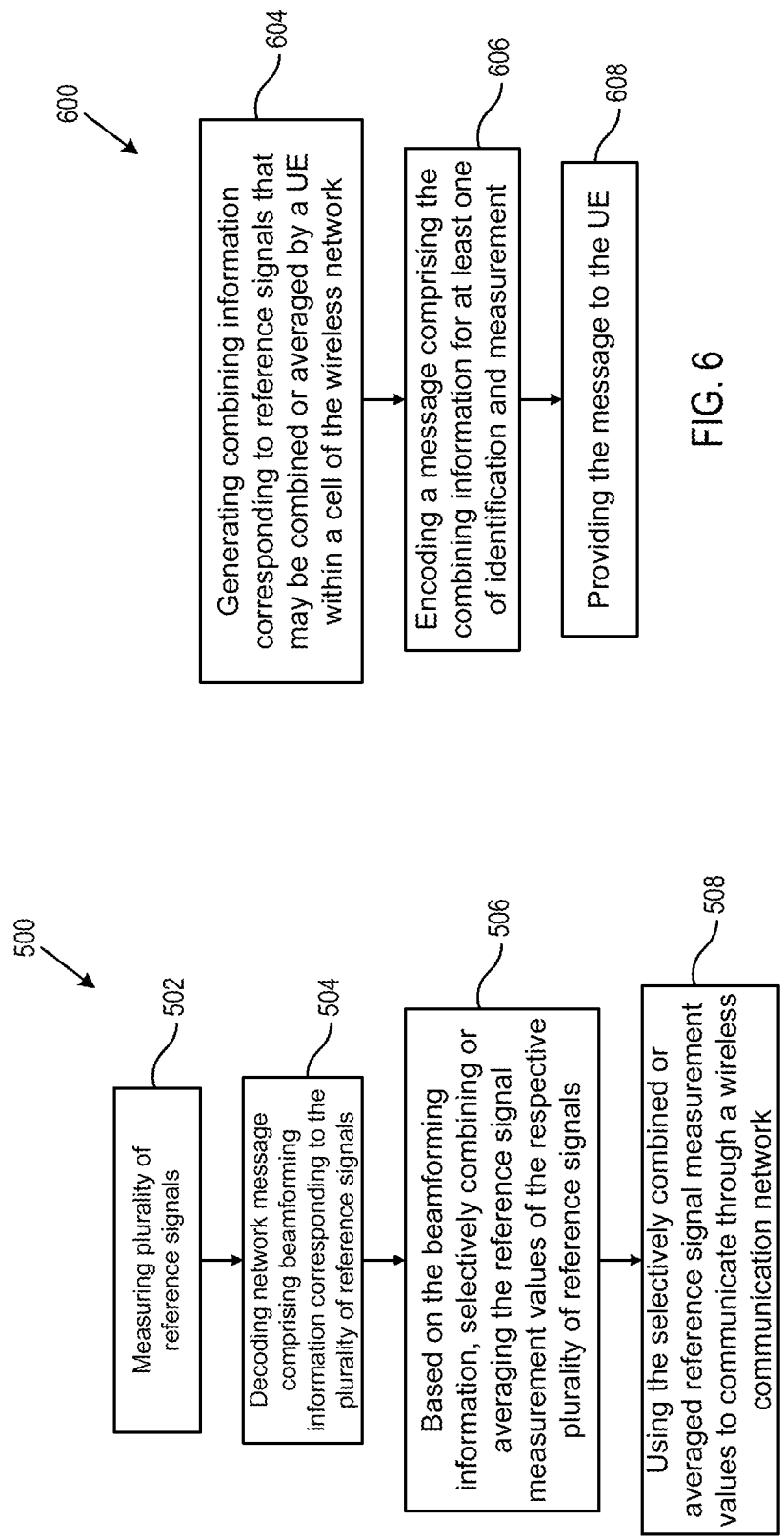

CHANNEL ESTIMATION USING A PLURALITY OF BEAMFORMED REFERENCE SIGNALS

RELATED APPLICATIONS

This application is a national stage filing under 35 U.S.C. § 371 of International Patent Application No. PCT/US2018/044741, filed Aug. 1, 2018, which claims the benefit of U.S. Provisional Patent Application No. 62/540,846 filed Aug. 3, 2017, each of which is hereby incorporated by reference herein in its entirety.

TECHNICAL FIELD

This disclosure relates generally to wireless communication systems, and more particularly, to synchronization signal (SS) blocks transmitted with or without beamforming.

BACKGROUND

Wireless mobile communication technology uses various standards and protocols to transmit data between a base station and a wireless mobile device. Wireless communication system standards and protocols can include the third Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi; and the MulteFire standard developed by MulteFire Alliance. In 3GPP radio access networks (RANs) in LTE systems, the base station can include a RAN node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE) and in MulteFire systems can include a MF-AP. In next generation (NextGen) or fifth generation (5G) wireless RANs, RAN Nodes can include a 5G node, new radio (NR) node or g Node B (gNB).

BRIEF DESCRIPTION OF THE DRAWINGS

FIG. 5 is a flow chart of a method for selectively combining or averaging reference signal measurement values according to one embodiment.

FIG. 6 is a flow chart of a method for a network to indicate combining or averaging information to a UE for identification and/or measurement according to one embodiment.

DETAILED DESCRIPTION OF PREFERRED EMBODIMENTS

Figure 1:
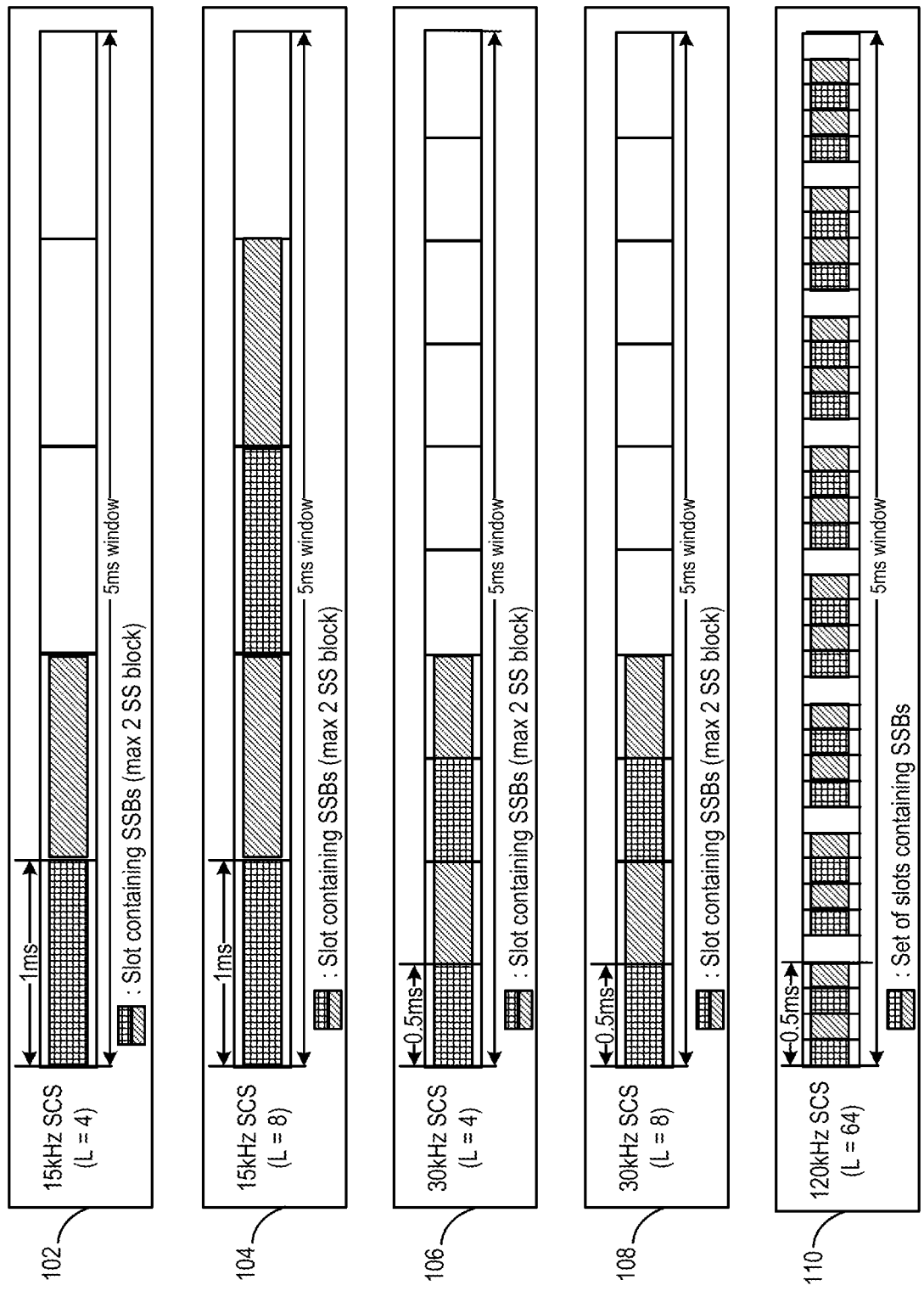
FIG. 1 is a schematic diagram illustrating mapping synchronization signal blocks (SSBs) to slots in a half radio frame according to certain embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

Various example characteristics of reference signals (e.g., patterns of reference signals, periodicity of reference signals, etc.) are provided below. In certain 5G systems, beamforming may be used to transmit some reference signals but not other reference signals. For example, a synchronization signal (SS) block may be transmitted with or without transmission (Tx) beamforming by an NR node or gNB. However, it may be desirable to specify and/or distinguish the UE behavior for the identification or measurement in beamforming case(s) and in non-beamforming case(s). To avoid the ambiguity for UE behavior, embodiments provide that a network (e.g., a gNB or a core network element) may indicate some information to the UE for identification and measurement purposes.

In first example embodiments, a network may indicate beamforming information to a UE by, e.g., using broadcasting or dedicated signaling (e.g., radio resource control (RRC) signaling). In some embodiments, the network may indicate whether all the reference signals are beamformed or not. In some embodiments, the network may indicate which reference signals are using the same Tx beamforming on the time domain. In some embodiments, the network may indicate which reference signals are using the same beamforming on the frequency domain (e.g., using a frequency index). In some embodiments, the network may indicate which reference signals are using beamforming on the frequency domain and the time domain (e.g., using a frequency index and a time index).

In the first example embodiments, the reference signals may include, for example, one or more of a primary synchronization signal (PSS), a secondary synchronization signal (SSS), a physical broadcast channel (PBCH), a channel-state information reference signal (CSI-RS), a demodulation reference signal (DMRS or DM-RS), and/or some other suitable reference signal.

In second example embodiments, the network may indicate combining or averaging information to a UE for identification and/or measurement by, e.g., using broadcasting or dedicated signaling. In some embodiments, the network may indicate whether all the reference signals may be combined or averaged for identification and measurement or not. In some embodiments, the network may indicate which reference signals can be combined or averaged on the time domain (e.g., using a time index). In some embodiments, the network may indicate which reference signals can be combined or averaged on the frequency domain, e.g., using a frequency index. In some embodiments, the network may indicate which reference signals can be combined or averaged on the frequency domain and the time domain, e.g., using a frequency index and a time index.

In the second example embodiments, the reference signals may include, for example, one or more of a PSS, SSS, PBCH, CSI-RS, DMRS, and/or some other suitable reference signal.

In third example embodiments, a frequency index associated with an SS block for a target cell may be included in a PBCH or network assistance information (NAI) corresponding to the target cell. In some embodiments, the frequency index may be a frequency identifier. In some embodiments, the frequency index may be a numeric number of a frequency position (e.g., "0" as a first place of an SS block position).

A. Example SS Block Design

By way of example, and not by limitation, an SS block design may include some or all of the following characteristics.

In some implementations, the sequence type may be the Gold sequence. In such implementations, if cross correlation issues are found, other sequences can be considered. In some implementations, sequence initialization may be from a cell identifier (ID), and two or three bits from time identification. In some implementations, there may be different sequences in the N number of NR)-PBCH symbols. Further, future implementations may include using a longer sequence, different mapping, different initialization, etc.

Some implementations may use equal DMRS density across NR-PBCH with three resource element (RE)/physical resource block (PRB)/symbol.

In some implementations, DMRS may have the same RE position in all NR-PBCH symbols.

In implementations where there are two PBCH symbols within an SS block, then the SS block may be ordered as PSS-PBCH-SSS-PBCH. The PBCH RE mapping may, according to a one alternative, be NR-PBCH coded bits of the NR-PBCH code block(s) that are mapped across REs in N PBCH symbols, where N is the number of PBCH symbols in a NR-SS block.

In some implementations, 30 kHz subcarrier spacing may be used. In some implementations, 120 kHz and/or 240 kHz subcarrier spacing may be used. Other subcarrier spacing may also be used, e.g., if there are implications to UE automatic gain control (AGC) operation.

In implementations where 15 kHz subcarrier spacing is used, two SS block candidate locations may be mapped to a slot of 14 symbols as follows: a first candidate location is at symbols 2-5; and a second candidate location is at symbols 8-11.

In implementations where 30 kHz subcarrier spacing is used, the second SS block mapping pattern may map two SS blocks candidate locations to a slot of 14 symbols as follows: a first candidate location is at symbols 2-5; and a second candidate location is at symbols 8-11. Note that in the case of NR-LTE coexistence, the first SS block mapping pattern can be used. Also note that the SS block mapping pattern for each frequency band may be determined at a later time.

FIG. 1 is a schematic diagram illustrating mapping SS blocks (SSBs) to slots in a half radio frame according to certain embodiments using 15 kHz, 30 kHz, and 120 kHz subcarrier spacing (SCS). The illustrated half radio frame structures in these examples correspond to a 5 millisecond (ms) window. A first example frame structure 102 is configured for 15 kHz SCS with four SS block candidate locations (L=4), wherein each of the indicated slots may include a maximum of two SS blocks. A second example frame structure 104 is configured for 15 kHz SCS with eight SS block candidate locations (L=8), wherein each of the indicated slots may include a maximum of two SS blocks. A third example frame structure 106 is configured for 30 kHz SCS with four SS block candidate locations (L=4), wherein each of the indicated slots may include a maximum of two SS blocks. A fourth example frame structure 108 is configured for 30 kHz SCS with eight SS block candidate locations (L=8), wherein each of the indicated slots may include a maximum of two SS blocks. A fifth example frame structure 110 is configured for 120 kHz SCS with 64 SS block candidate locations (L=64). It should be noted that in certain embodiments of these examples, for NR and LTE coexistence, duplex direction alignment can be achieved by sub-frame offset.

Figure 2:
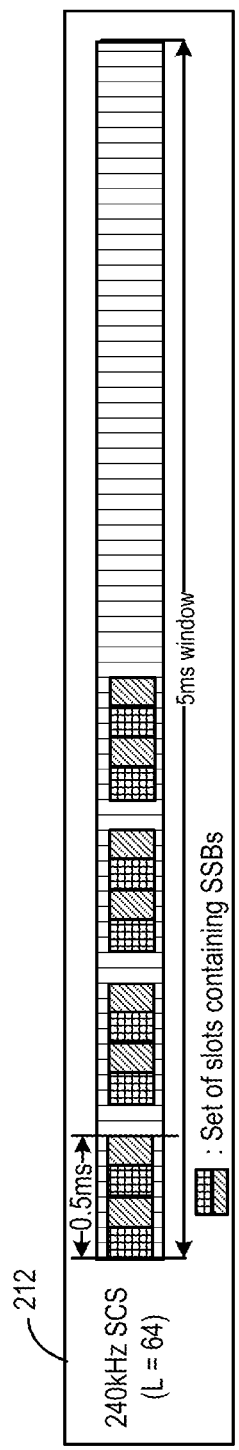
FIG. 2 is a schematic diagram illustrating mapping SSBs to slots in a half radio frame according to other embodiments.

FIG. 2 is a schematic diagram illustrating mapping SSBs to slots in a half radio frame according to certain embodiments using 240 kHz SCS. The illustrated half radio frame structure in this example corresponds to a 5 ms window. The example frame structure 110 is configured for 24 kHz SCS with 64 SS block candidate locations (L=64).

In some implementations, three bits of an SS block index are carried by changing the DMRS sequence within each 5 ms period. In certain such implementations, the number of bits carried in this way may be limited to two bits if carrying three bits is shown to cause problems. Future implementations may include details of scrambling of the PBCH, which may or may not carry a part of timing information. In addition, or in other future implementations, a 5 ms half radio frame interval indication may be included. In some implementations, remaining bits of the timing information are carried explicitly in the NR-PBCH payload.

In some implementations, an indication related to synchronization information may be provided to the user equipment (UE). In certain such implementations, when there is the indication for a carrier, the UE can utilize serving cell timing to derive the index of a SS block transmitted by neighbor cell (e.g., radio frame or System Frame Number (SFN) or symbol level synchronization)

As indicated above, however, a gNB may transmit the SS block with or without Tx beamforming. Thus, it may be desirable to specify the UE behavior for the identification or measurement in beamforming case(s) or in non-beamforming case(s). To avoid the ambiguity for UE behavior, embodiments herein provide that the network (e.g., a gNB or a core network element) may indicate some information to the UE, e.g., for identification and measurement purposes.

B. Example Embodiments of a Network Indicating Beamforming Information to a UE As indicated above, in some embodiments, a network indicates beamforming information to a UE (e.g., using broadcasting or dedicated signaling). In certain such embodiments, the network indicates whether all the reference signals are beamformed or not. In addition or in other embodiments, the network indicates which reference signals are using the same Tx beamforming on the time domain. In other embodiments, the network indicates which reference signals are using the same beamforming on the frequency domain (e.g., using a frequency index). In other embodiments, the network indicates which reference signals are using beamforming on the frequency domain and the time domain (e.g., using a frequency index and a time index). The reference signals may include, for example, one or more of a PSS, an SSS, a PBCH, a CSI-RS, a DMRS, and/or some other suitable reference signal.

In certain embodiments, the network indicates whether all the reference signals (RS) are beamformed or not. For example, the network may send a dedicated signaling message or broadcast information to let UE know the SSS of target cell is beamformed or not. If the SSS of the target cell is not beamformed (e.g., is transmitted with an omnidirectional antenna), then the UE may perform averaging of physical measurement results of the SSS in SS burst set periodicity for both time domain and/or frequency domain. Otherwise (if the reference signals are beamformed), the UE may only perform the averaging of physical measurement results of the SSS with same index among different SS burst set periodicity.

In certain embodiments, the network may indicate which reference signals are using the same Tx beamforming on time domain. For example, the network may send dedicated signaling or broadcast an information to let the UE know some SSS (e.g., i-th SSS and j-th SSS) of a target cell within an SS burst set periodicity that are using the same Tx beamforming pattern. Then, the UE may perform the averaging of physical measurement results of those SSS (e.g., i-th SSS and j-th SSS) in an SS burst set periodicity for the time domain. When certain properties of a channel over which a symbol of one antenna port is conveyed can be inferred from the channel over which a symbol on the other antenna port is conveyed, the two antenna ports are said to be quasi-colocated (QCL). By way of example, QCL reference signal antenna ports are regarded to be the same as one another in at least one of Doppler spread, Doppler shift, average delay, delay spread, and/or reception spatial parameters.

Thus, for example, a network may configure CSI-RS based radio resource management (RRM) measurements at a UE by communicating an associated SSB parameter (e.g., in an RRC message) including an SSB-index parameter and a QCL parameter (which may be referred to as an "isQuasiColocated" parameter). If the associated SSB parameter is received by the UE, the UE may base the timing of an indicated CSI-RS resource on the timing of the cell indicated by a cell ID. In this case, the UE may not monitor the CSI-RS resource if it cannot detect an indicated SS/PBCH block. If the UE does not detect the associated SSB parameter, the UE bases the timing of the SCI-RS resource on the timing of the serving cell. In this case, the UE measures the SCI-RS resource even if SS/PBCH block(s) in the cell ID are not detected. In certain embodiments, the CSI-RS resource, based on the QCL parameter, is either QCL'ed or not QCL'ed with the associated SSB in spatial parameters.

Figure 3:
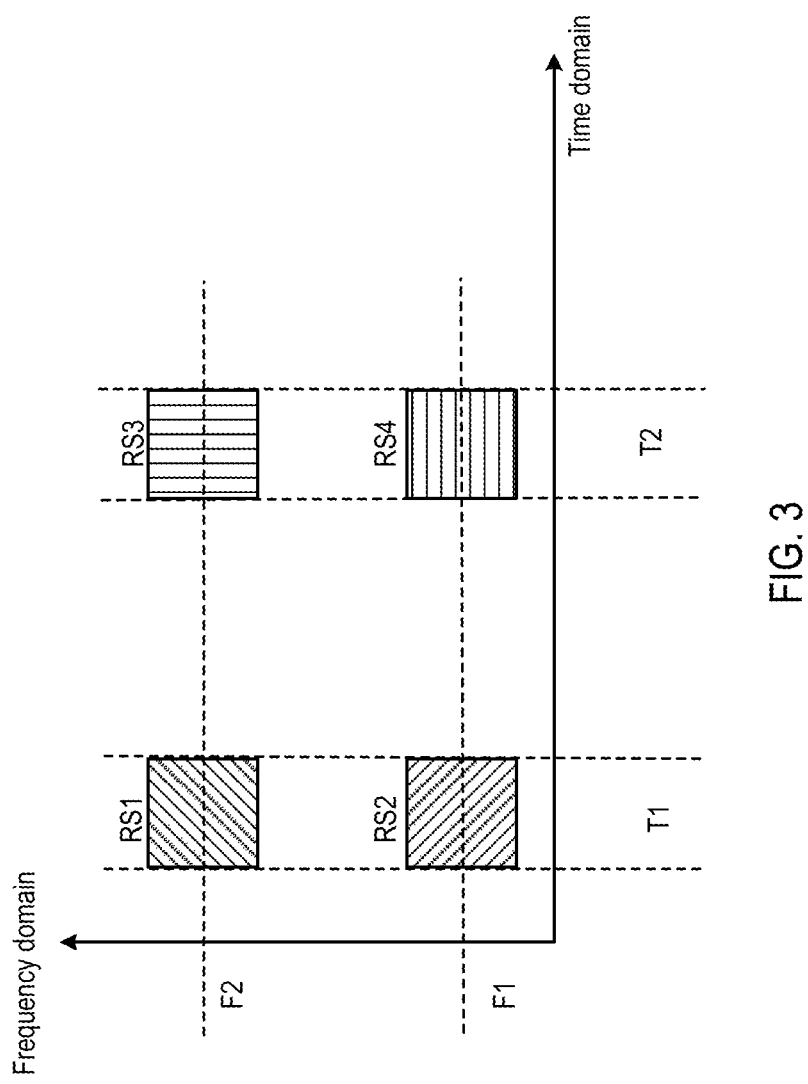
FIG. 3 is a schematic diagram of time and frequency transmission resources for reference signals according to certain embodiments.

For illustrative purposes, FIG. 3 is a schematic diagram of time and frequency transmission resources for reference signals according to certain embodiments. The transmission resources are shown with respect to a time domain axis and a frequency domain axis. In this example, a first reference signal (RS1) block of resources corresponds to a first time T1 and a second frequency F2, a second reference signal (RS2) block of resources corresponds to the first time T1 and a first frequency F1, a third reference signal (RS3) block of resources corresponds to a second time T2 and the second frequency F2, and a fourth reference signal (RS4) block of resources corresponds to the second time T2 and the first frequency F1.

In certain embodiments, the network may indicate which reference signals are using the same beamforming on the frequency domain (e.g., using a frequency index). For example, the network may send dedicated signaling or broadcast an information to let the UE know some SSS (e.g., RS1 and RS2 shown in FIG. 3) of a target cell within the first time T1 that are using the same Tx beamforming pattern. Then, the UE may perform averaging of physical measurement results of those SSS (e.g., RS1 and RS2 shown in FIG. 3) in an SS burst set periodicity for the frequency domain. The frequency index can be assumed as a frequency identifier for the reference signal, e.g., F1 and F2 shown in FIG. 3 (e.g., center frequency of the SS block).

In certain embodiments, the network may indicate which reference signals are using beamforming on the frequency domain and the time domain (e.g., using a time index and a frequency index). For example, the network may send dedicated signaling or broadcast an information to let the UE know some SSS (e.g., RS1 and RS4 shown in FIG. 3) of a target cell that are using the same Tx beamforming pattern. Then, the UE may perform the averaging of physical measurement results of those SSS (e.g., RS1 and RS4 shown in FIG. 3) in SS burst set periodicity. The frequency index can be assumed as a frequency identifier for reference signal, e.g., F1 and F2 shown by FIG. 3. Additionally, the time index can be assumed as a time identifier for the reference signal (e.g., system frame index and/or half frame index and/or slot index and/or symbol index).

C. Example Embodiments of a Network Indicating Combining Information to a UE

As indicated above, in some embodiments, a network may indicate combining or averaging information to a UE for identification and/or measurement (e.g., using broadcasting or dedicated signaling). In certain such embodiments, the network may indicate whether all the reference signals may be combined or averaged for identification and measurement or not. In other embodiments, the network may indicate which reference signals can be combined or averaged on the time domain (e.g., using a time index). In other embodiments, the network may indicate which reference signals can be combined or averaged on the frequency domain, e.g., using a frequency index. In other embodiments, the network may indicate which reference signals can be combined or averaged on the frequency domain and the time domain, e.g., using a frequency index and a time index. The reference signals may include, for example, one or more of a PSS, SSS, PBCH, CSI-RS, DMRS, and/or some other suitable reference signal.

In certain embodiments, the network may indicate whether or not all the reference signals can be combined or averaged for identification and measurement. For example, the network may send dedicated signaling or broadcast information to let the UE know whether the SSS of a target cell can be averaged during the physical layer measurement or not. If the SSS of target cell can be averaged, then the UE may perform the averaging of physical measurement results of SSS in SS burst set periodicity for both time domain and/or frequency domain. Otherwise, the UE may only perform the averaging of physical measurement results of SSS with the same index among different SS burst set periodicity.

In certain embodiments, the network may indicate to the UE which SS blocks or a maximum number of SS blocks to average to determine a cell measurement. In addition, or in other embodiments, the network may indicate to the UE which CSI-RS or a maximum number of SCI-RS to average to determine a cell measurement. In certain such embodiments, the network may configure the UE to derive reference signal received power (RSRP), reference signal received quality (RSRQ) and signal to interference plus noise ratio (SINR) measurement results per cell associated to NR measurement objects based on parameters configured by the network. For each cell measurement quantity to be derived based on the SS/PBCH block: if the number of SS blocks to average in the associated measurement object is not configured, or if an threshold value for SS blocks consolidation is the associated measurement object is not configured, or if the highest beam measurement quantity value is below the an threshold value for SS blocks consolidation, the UE may be configured to derive each cell measurement quantity based on SS/PBCH block as the highest beam measurement quantity value. Else, the UE may be configured to derive each cell measurement quantity based on SS/PBCH block as the linear average of the power values of the highest beam measurement quantity values above the an threshold value for SS blocks consolidation, where the total number of averaged beams does not exceed the number of SS blocks to average indicated by the network.

Similarly, for certain embodiments, for each cell measurement quantity to be derived based on CSI-RS: consider a CSI-RS resource to be applicable for deriving cell measurements when the concerned CSI-RS resource is included in a configuration message from the network including the physical cell ID of the cell in the associated measurement object; if the number of SCI-RS resources to average is not configured; or if a threshold CSI-RS consolidation value in the associated measurement object is not configured; or if the highest beam measurement quantity value is below the threshold CSI-RS consolidation value, the UE may be configured to derive each cell measurement quantity based on applicable CSI-RS resources for the cell as the highest beam measurement quantity value. Else, the UE may be configured to derive each cell measurement quantity based on CSI-RS as the linear average of the power values of the highest beam measurement quantity values above the threshold CSI-RS consolidation value, where the total number of averaged beams does not exceed the number of CSI-RS resources to average indicated by the network to the UE.

In certain embodiments, the network may indicate which reference signals can be combined or averaged on the time domain, e.g., using a time index. For example, the network may send dedicated signaling or broadcast information to let the UE know some SSS (e.g., i-th SSS and j-th SSS) of a target cell within an SS burst set periodicity that can be averaged during physical layer measurement. Then, the UE may perform the averaging of physical measurement results of those SSS (e.g., i-th SSS and j-th SSS) in SS burst set periodicity for the time domain. The time index here can be assumed as a time identifier for the reference signal, e.g., system frame index and/or half frame index and/or slot index and/or symbol index.

In certain embodiments, the network may indicate which reference signals can be combined or averaged on the frequency domain, e.g., using a frequency index. For instance, the network may send dedicated signaling or broadcast information to let the UE know some SSS (e.g., RS1 and RS2 shown in FIG. 3) of target cell within the first time T1 that can be averaged during physical layer measurement. Then the UE may perform the averaging of physical measurement results of those SSS (e.g., RS1 and RS2 shown in FIG. 3) in SS burst set periodicity for frequency domain. The frequency index can be assumed as a frequency identifier for the reference signal, e.g., F1 and F2 shown in FIG. 3.

In certain embodiments, the network may indicate which reference signals can be combined or averaged on the frequency domain and the time domain, e.g., using a time index and a frequency index. For example, the network may send dedicated signaling or broadcast information to let the UE know some SSS (e.g., RS1 and RS4 shown in FIG. 3) of target cell can be averaged during physical layer measurement. Then, the UE may perform the averaging of physical measurement results of those SSS (e.g., RS1 and RS4 shown in FIG. 3) in SS burst set periodicity. The frequency index can be assumed as a frequency identifier for the reference signal (e.g., F1 and F2 shown in FIG. 3). The time index can be assumed as a time identifier for the reference signal, e.g., system frame index and/or half frame index and/or slot index and/or symbol index.

D. Example Embodiments of Providing a Frequency Index Associated with an SS Block for a Target Cell As indicated above, in certain embodiments, a frequency index associated with an SS block for a target cell may be included in a PBCH or network assistance information (NAI) corresponding to the target cell. In certain such embodiments, the frequency index may be a frequency identifier (e.g., a center frequency of an SS block). In other embodiments, the frequency index may be a numeric number of a frequency position (e.g., "0" as a first place of an SS block position).

Figure 4:
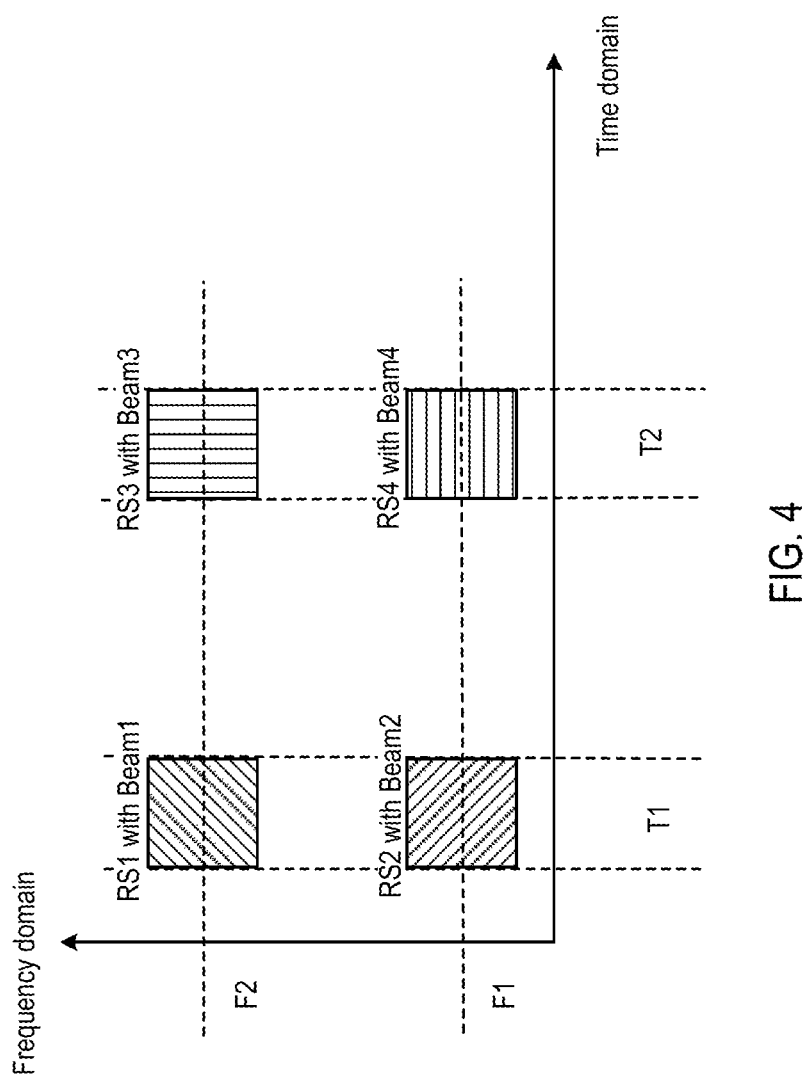
FIG. 4 is a schematic diagram of time and frequency transmission resources for reference signals according to certain other embodiments.

For illustration, FIG. 4 is a schematic diagram of time and frequency transmission resources for reference signals according to certain embodiments. The transmission resources are shown with respect to a time domain axis and a frequency domain axis. In this example, a first reference signal (RS1) block of resources with a first beam (Beam1) corresponds to a first time T1 and a second frequency F2, a second reference signal (RS2) block of resources with a second beam (Beam2) corresponds to the first time T1 and a first frequency F1, a third reference signal (RS3) block of resources with a third beam (Beam3) corresponds to a second time T2 and the second frequency F2, and a fourth reference signal (RS4) block of resources with a fourth beam (Beam4) corresponds to the second time T2 and the first frequency F1.

For beam management, if SS blocks with in same orthogonal frequency-division multiplexing (OFDM) symbols are distributed on different frequencies and different beams are used for those SS blocks (e.g., RS1 with Beam1 and RS2 with Beam2 shown in FIG. 4), the UE may need to differentiate the beams among the different SS blocks in the same OFDM symbols. In the example shown in FIG. 4, the frequency index for RS1 and RS2 could be F1 and F2, respectively (e.g., absolute or relative frequency). In other embodiments, the frequency index may be a numeric number corresponding to a frequency position (e.g., 0, 1, 2, . . . , f, where 0 is a first place of the SS block position).

E. Example Embodiments

FIG. 5 is a flow chart of a method 500 for selectively combining or averaging reference signal measurement values according to one embodiment. The method 500 may be performed, for example, the devices, networks, systems, chips, components, or portions thereof, shown in FIGS. 7-11. The method 500 includes measuring 502 a plurality of reference signals and decoding 504 network message comprising beamforming information corresponding to the plurality of reference signals. Based on the beamforming information, the method 500 further includes selectively combining or averaging 506 the reference signal measurement values of the respective plurality of reference signals. The method 500 further includes using 508 the selectively combined or averaged reference signal measurement values to communicate through a wireless communication network.

FIG. 6 is a flow chart of a method 600 for a network to indicate combining or averaging information to a UE for identification and/or measurement according to one embodiment. The method 600 may be performed, for example, the devices, networks, systems, chips, components, or portions thereof, shown in FIGS. 7-11. The method 600 includes generating 604 combining information corresponding to reference signals that may be combined or averaged by a UE within a cell of the wireless network. The method 600 further includes encoding 606 a message comprising the combining information for at least one of identification and measurement. The method 600 also includes providing 608 the message to the UE.

The following are additional examples, according to certain embodiments.

Example 1A may include a network to indicate the beamforming information to a UE by using broadcasting or dedicated signaling, wherein: the network may indicate whether all the reference signals is beamformed or not; or the network may indicate which reference signals are using the same Tx beamforming on time domain; or the network may indicate which reference signals are using the same beamforming on frequency domain, e.g., using frequency index, or the network may indicate which reference signals are using beamforming on frequency domain and time domain, e.g., using time index and frequency index.

Example 2A may include the network of example 1A and/or some other example herein, wherein the reference signals comprise: PSS (primary synchronization signal), and/or SSS (secondary synchronization signal), and/or PBCH (Physical broadcast channel), and/or CSI-RS (Channel-State Information reference signal), and/or DM-RS (Demodulation reference signal), and/or other reference signal(s).

Example 3A may include a network to indicate the combining or averaging information to UE for identification and/or measurement by using broadcasting or dedicated signaling, wherein: the network may indicate whether all the reference signals can be combined or averaged for identification and measurement or not; or the network may indicate which reference signals can be combined or averaged on time domain, e.g., using time index; or the network may indicate which reference signals can be combined or averaged on frequency domain, e.g., using frequency index; or the network may indicate which reference signals can be combined or averaged on frequency domain and time domain, e.g., using time index and frequency index.

Example 4A may include the network of example 3A and/or some other example herein, wherein the reference signals comprise: PSS (primary synchronization signal), and/or SSS (secondary synchronization signal), and/or PBCH (Physical broadcast channel), and/or CSI-RS (Channel-State Information reference signal), and/or DM-RS (Demodulation reference signal), and/or other reference signal(s).

Example 5A may include a frequency index associated with a synchronization signal (SS) block for target cell may be included in the PBCH or the network assistance information (NAI) of this target cell.

Example 6A may include the network of example 5A and/or some other example herein, wherein the frequency index may be the frequency identifier.

Example 7A may include the network of example 5A and/or some other example herein, wherein the frequency index may be the numeric number of frequency position, e.g., "0" as the first place of SS block position.

Example 8A may include a system comprising the network of any of examples 1A-4A and the frequency index of examples 5A-7A.

Example 9A may include an apparatus comprising means to perform one or more elements of a method described in or related to any of examples 1A-8A, or any other method or process described herein.

Example 10A may include one or more non-transitory computer-readable media comprising instructions to cause an electronic device, upon execution of the instructions by one or more processors of the electronic device, to perform one or more elements of a method described in or related to any of examples 1A-8A, or any other method or process described herein.

Example 11A may include an apparatus comprising logic, modules, or circuitry to perform one or more elements of a method described in or related to any of examples 1A-8A, or any other method or process described herein.

Example 12A may include a method, technique, or process as described in or related to any of examples 1A-8A, or portions or parts thereof.

Example 13A may include an apparatus comprising: one or more processors and one or more computer readable media comprising instructions that, when executed by the one or more processors, cause the one or more processors to perform the method, techniques, or process as described in or related to any of examples 1A-8A, or portions thereof.

Example 14A may include a signal as described in or related to any of examples 1A-8A, or portions or parts thereof.

Example 15A may include a signal in a wireless network as shown and described herein.

Example 16A may include a method of communicating in a wireless network as shown and described herein.

Example 17A may include a system for providing wireless communication as shown and described herein.

Example 18A may include a device for providing wireless communication as shown and described herein.

F. Example Systems and Devices

Figure 7:
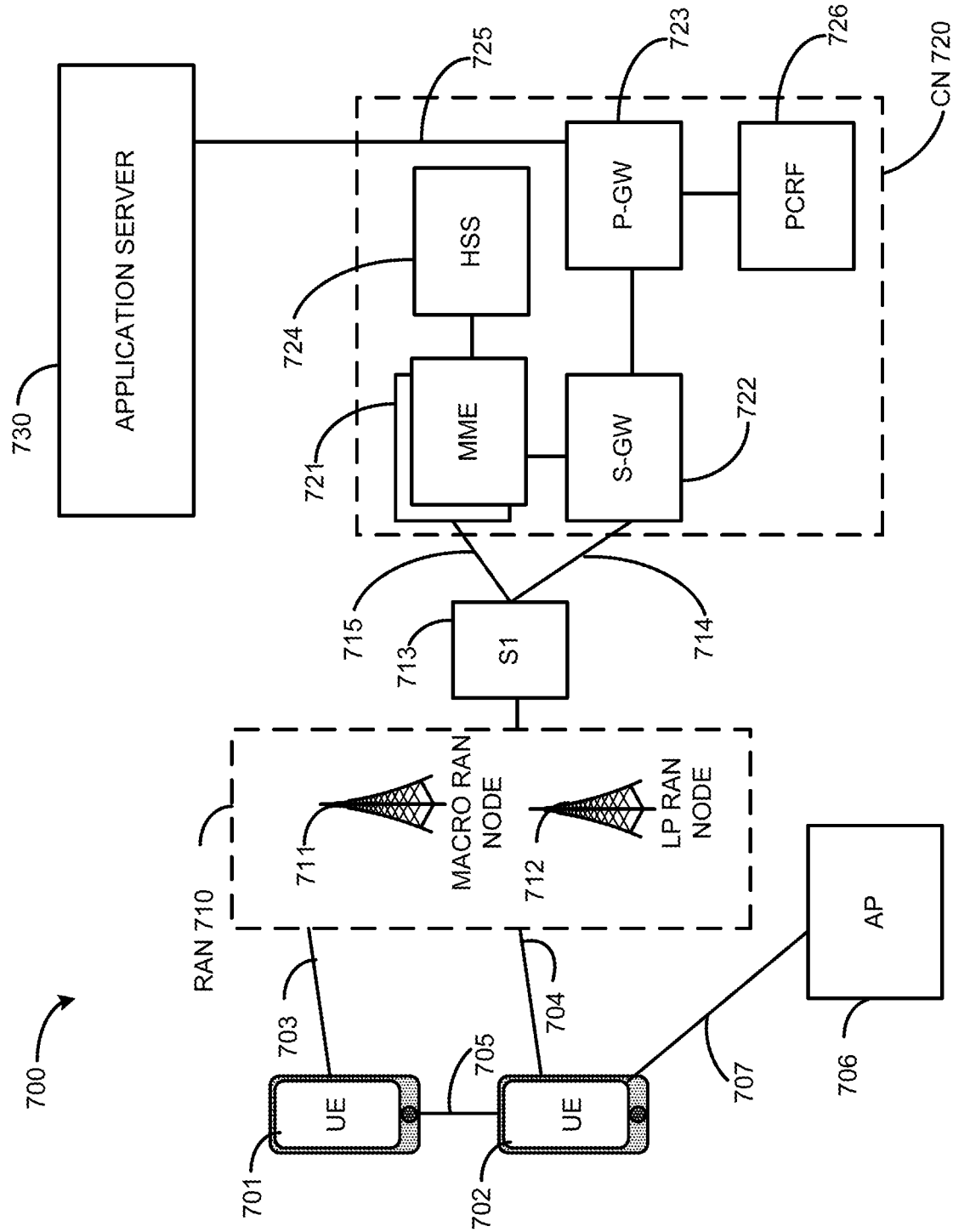
FIG. 7 illustrates an architecture of a system of a network in accordance with some embodiments.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710. The RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.11 protocol, wherein the AP 706 would comprise a wireless fidelity (WiFi®) router. In this example, the AP 706 may be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 702 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching.

Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and a serving gateway (S-GW) 722, and an S1-mobility management entity (MME) interface 715, which is a signaling interface between the RAN nodes 711 and 712 and MMEs 721.

In this embodiment, the CN 720 comprises the MMEs 721, the S-GW 722, a Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the CN 720 (e.g., an EPC network) and external networks such as a network including the application server 730 (alternatively referred to as application function (AF)) via an Internet Protocol (IP) interface 725. Generally, an application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. A Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

Figure 8:
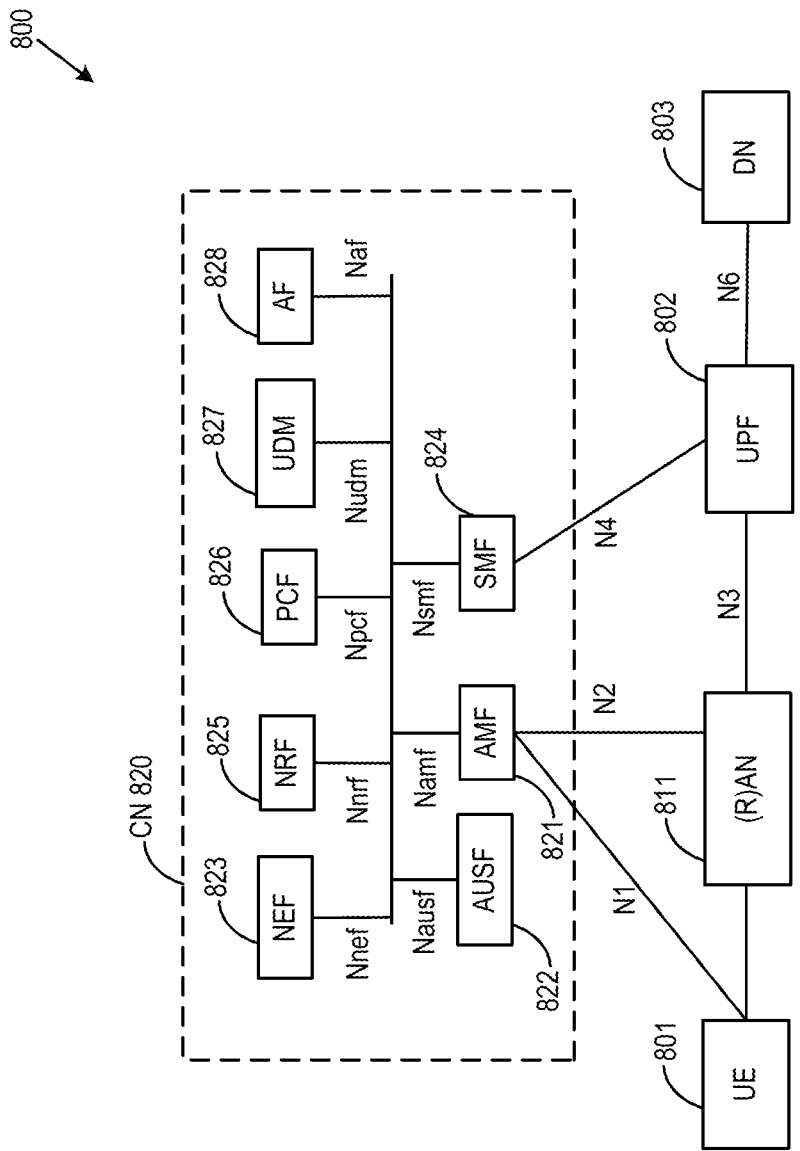
FIG. 8 illustrates an architecture of a system of a network in accordance with some embodiments.

FIG. 8 illustrates an architecture of a system 800 of a network in accordance with some embodiments. The system 800 is shown to include a UE 801, which may be the same or similar to UEs 701 and 702 discussed previously; a RAN node 811, which may be the same or similar to RAN nodes 711 and 712 discussed previously; a User Plane Function (UPF) 802; a Data network (DN) 803, which may be, for example, operator services, Internet access or 3rd party services; and a 5G Core Network (5GC or CN) 820.

The CN 820 may include an Authentication Server Function (AUSF) 822; a Core Access and Mobility Management Function (AMF) 821; a Session Management Function (SMF) 824; a Network Exposure Function (NEF) 823; a Policy Control function (PCF) 826; a Network Function (NF) Repository Function (NRF) 825; a Unified Data Management (UDM) 827; and an Application Function (AF) 828. The CN 820 may also include other elements that are not shown, such as a Structured Data Storage network function (SDSF), an Unstructured Data Storage network function (UDSF), and the like.

The UPF 802 may act as an anchor point for intra-RAT and inter-RAT mobility, an external PDU session point of interconnect to DN 803, and a branching point to support multi-homed PDU session. The UPF 802 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 802 may include an uplink classifier to support routing traffic flows to a data network. The DN 803 may represent various network operator services, Internet access, or third party services. NY 803 may include, or be similar to application server 730 discussed previously.

The AUSF 822 may store data for authentication of UE 801 and handle authentication related functionality. Facilitates a common authentication framework for various access types.

The AMF 821 may be responsible for registration management (e.g., for registering UE 801, etc.), connection management, reachability management, mobility management, and lawful interception of AMF-related events, and access authentication and authorization. AMF 821 may provide transport for SM messages between and SMF 824, and act as a transparent proxy for routing SM messages. AMF 821 may also provide transport for short message service (SMS) messages between UE 801 and an SMS function (SMSF) (not shown by FIG. 8). AMF 821 may act as Security Anchor Function (SEA), which may include interaction with the AUSF 822 and the UE 801, receipt of an intermediate key that was established as a result of the UE 801 authentication process. Where USIM based authentication is used, the AMF 821 may retrieve the security material from the AUSF 822. AMF 821 may also include a Security Context Management (SCM) function, which receives a key from the SEA that it uses to derive access-network specific keys. Furthermore, AMF 821 may be a termination point of RAN CP interface (N2 reference point), a termination point of NAS (N1) signaling, and perform NAS ciphering and integrity protection.

AMF 821 may also support NAS signaling with a UE 801 over an N3 interworking-function (IWF) interface. The N3IWF may be used to provide access to untrusted entities. N33IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control-plane NAS (N1) signaling between the UE 801 and AMF 821, and relay uplink and downlink user-plane packets between the UE 801 and UPF 802. The N3IWF also provides mechanisms for IPsec tunnel establishment with the UE 801.

The SMF 824 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 824 may include the following roaming functionality: handle local enforcement to apply QoS SLAs (VPLMN); charging data collection and charging interface (VPLMN); lawful intercept (in VPLMN for SM events and interface to LI System); support for interaction with external DN for transport of signaling for PDU session authorization/authentication by external DN.

The NEF 823 may provide means for securely exposing the services and capabilities provided by 3GPP network functions for third party, internal exposure/re-exposure, Application Functions (e.g., AF 828), edge computing or fog computing systems, etc. In such embodiments, the NEF 823 may authenticate, authorize, and/or throttle the AFs. NEF 823 may also translate information exchanged with the AF 828 and information exchanged with internal network functions. For example, the NEF 823 may translate between an AF-Service-Identifier and an internal 5GC information. NEF 823 may also receive information from other network functions (NFs) based on exposed capabilities of other network functions. This information may be stored at the NEF 823 as structured data, or at a data storage NF using a standardized interfaces. The stored information can then be re-exposed by the NEF 823 to other NFs and AFs, and/or used for other purposes such as analytics.

The NRF 825 may support service discovery functions, receive NF Discovery Requests from NF instances, and provide the information of the discovered NF instances to the NF instances. NRF 825 also maintains information of available NF instances and their supported services.

The PCF 826 may provide policy rules to control plane function(s) to enforce them, and may also support unified policy framework to govern network behavior. The PCF 826 may also implement a front end (FE) to access subscription information relevant for policy decisions in a UDR of UDM 827.

The UDM 827 may handle subscription-related information to support the network entities' handling of communication sessions, and may store subscription data of UE 801. The UDM 827 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 826. UDM 827 may also support SMS management, wherein an SMS-FE implements the similar application logic as discussed previously.

The AF 828 may provide application influence on traffic routing, access to the Network Capability Exposure (NCE), and interact with the policy framework for policy control. The NCE may be a mechanism that allows the 5GC and AF 828 to provide information to each other via NEF 823, which may be used for edge computing implementations. In such implementations, the network operator and third party services may be hosted close to the UE 801 access point of attachment to achieve an efficient service delivery through the reduced end-to-end latency and load on the transport network. For edge computing implementations, the 5GC may select a UPF 802 close to the UE 801 and execute traffic steering from the UPF 802 to DN 803 via the N6 interface. This may be based on the UE subscription data, UE location, and information provided by the AF 828. In this way, the AF 828 may influence UPF (re)selection and traffic routing. Based on operator deployment, when AF 828 is considered to be a trusted entity, the network operator may permit AF 828 to interact directly with relevant NFs.

As discussed previously, the CN 820 may include an SMSF, which may be responsible for SMS subscription checking and verification, and relaying SM messages to/from the UE 801 to/from other entities, such as an SMS-GMSC/IWMSC/SMS-router. The SMS may also interact with AMF 821 and UDM 827 for notification procedure that the UE 801 is available for SMS transfer (e.g., set a UE not reachable flag, and notifying UDM 827 when UE 801 is available for SMS).

The system 800 may include the following service-based interfaces: Namf: Service-based interface exhibited by AMF; Nsmf: Service-based interface exhibited by SMF; Nnef: Service-based interface exhibited by NEF; Npcf: Service-based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 800 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an N5 reference point may be between the PCF and the AF; an N7 reference point may be between the PCF and the SMF; an N11 reference point between the AMF and SMF; etc. In some embodiments, the CN 820 may include an Nx interface, which is an inter-CN interface between the MME (e.g., MME 721) and the AMF 821 in order to enable interworking between CN 820 and CN 720.

Although not shown by FIG. 8, system 800 may include multiple RAN nodes 811 wherein an Xn interface is defined between two or more RAN nodes 811 (e.g., gNBs and the like) that connecting to 5GC 820, between a RAN node 811 (e.g., gNB) connecting to 5GC 820 and an eNB (e.g., a RAN node 711 of FIG. 7), and/or between two eNBs connecting to 5GC 820.

In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 801 in a connected mode (e.g., CM-CONNECTED) including functionality to manage the UE mobility for connected mode between one or more RAN nodes 811. The mobility support may include context transfer from an old (source) serving RAN node 811 to new (target) serving RAN node 811; and control of user plane tunnels between old (source) serving RAN node 811 to new (target) serving RAN node 811.

A protocol stack of the Xn-U may include a transport network layer built on Internet Protocol (IP) transport layer, and a GTP—U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 9:
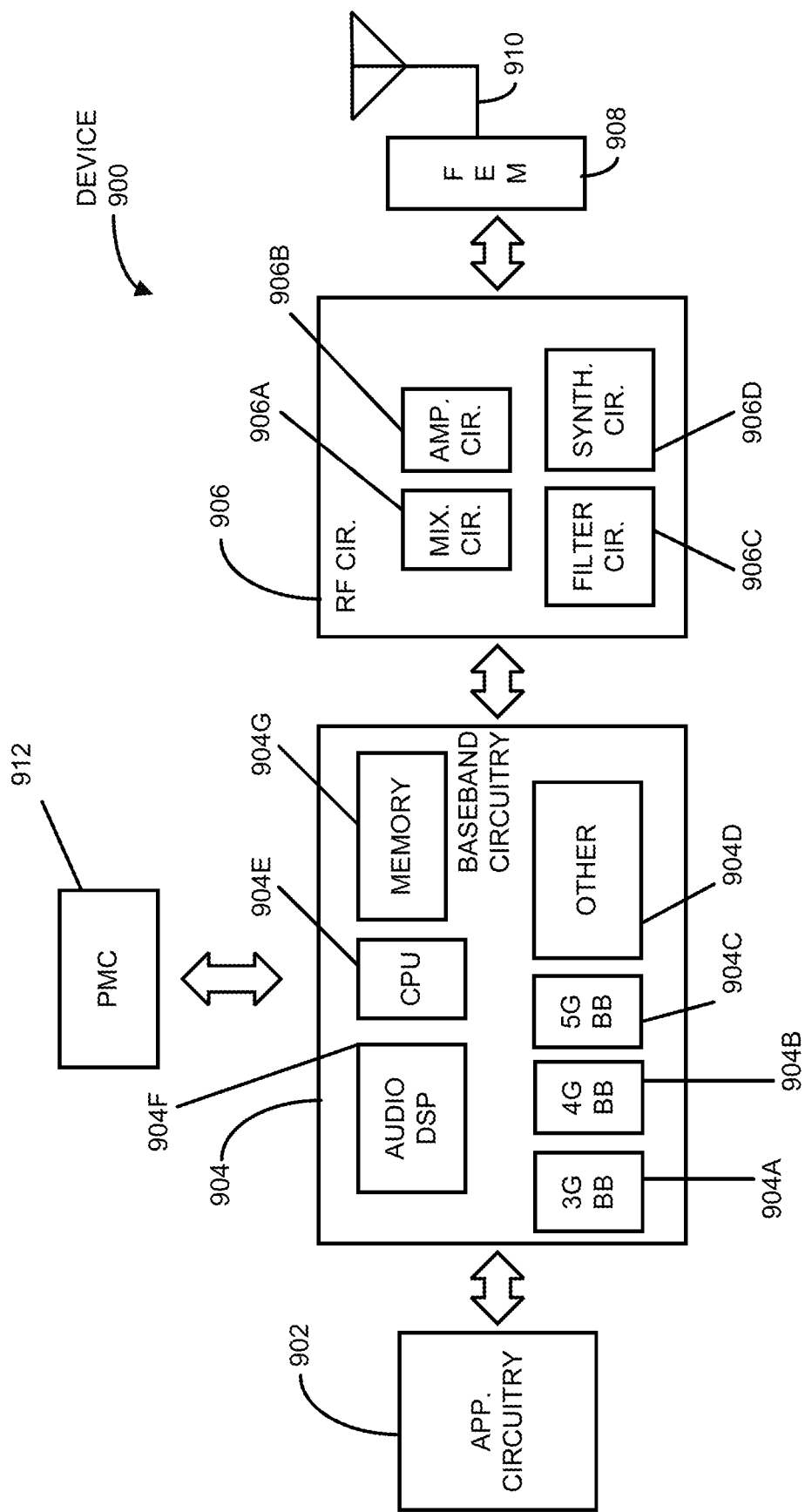
FIG. 9 illustrates example components of a device in accordance with some embodiments.

FIG. 9 illustrates example components of a device 900 in accordance with some embodiments. In some embodiments, the device 900 may include application circuitry 902, baseband circuitry 904, Radio Frequency (RF) circuitry 906, front-end module (FEM) circuitry 908, one or more antennas 910, and power management circuitry (PMC) 912 coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 906 and to generate baseband signals for a transmit signal path of the RF circuitry 906. Baseband processing circuitry 904 may interface with the application circuitry 902 for generation and processing of the baseband signals and for controlling operations of the RF circuitry 906. For example, in some embodiments, the baseband circuitry 904 may include a third generation (3G) baseband processor 904A, a fourth generation (4G) baseband processor 904B, a fifth generation (5G) baseband processor 904C, or other baseband processor(s) 904D for other existing generations, generations in development or to be developed in the future (e.g., second generation (2G), sixth generation (6G), etc.). The baseband circuitry 904 (e.g., one or more of baseband processors 904A-D) may handle various radio control functions that enable communication with one or more radio networks via the RF circuitry 906. In other embodiments, some or all of the functionality of baseband processors 904A-D may be included in modules stored in the memory 904G and executed via a Central Processing Unit (CPU) 904E. The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include one or more audio digital signal processor(s) (DSP) 904F. The audio DSP(s) 904F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. The RF circuitry 906 may include a receive signal path which may include circuitry to down-convert RF signals received from the FEM circuitry 908 and provide baseband signals to the baseband circuitry 904. RF circuitry 906 may also include a transmit signal path which may include circuitry to up-convert baseband signals provided by the baseband circuitry 904 and provide RF output signals to the FEM circuitry 908 for transmission.

In some embodiments, the receive signal path of the RF circuitry 906 may include mixer circuitry 906A, amplifier circuitry 906B and filter circuitry 906C. In some embodiments, the transmit signal path of the RF circuitry 906 may include filter circuitry 906C and mixer circuitry 906A. RF circuitry 906 may also include synthesizer circuitry 906D for synthesizing a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals and the filter circuitry 906C may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by the filter circuitry 906C.

In some embodiments, the mixer circuitry 906A of the receive signal path and the mixer circuitry 906A of the transmit signal path may include two or more mixers and may be arranged for quadrature downconversion and upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 906 may include analog-to-digital converter (ADC) and digital-to-analog converter (DAC) circuitry and the baseband circuitry 904 may include a digital baseband interface to communicate with the RF circuitry 906.

In some dual-mode embodiments, a separate radio IC circuitry may be provided for processing signals for each spectrum, although the scope of the embodiments is not limited in this respect.

In some embodiments, the synthesizer circuitry 906D may be a fractional-N synthesizer or a fractional N/N+1 synthesizer, although the scope of the embodiments is not limited in this respect as other types of frequency synthesizers may be suitable. For example, synthesizer circuitry 906D may be a delta-sigma synthesizer, a frequency multiplier, or a synthesizer comprising a phase-locked loop with a frequency divider.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 906D of the RF circuitry 906 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 906D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

FEM circuitry 908 may include a receive signal path which may include circuitry configured to operate on RF signals received from one or more antennas 910, amplify the received signals and provide the amplified versions of the received signals to the RF circuitry 906 for further processing. The FEM circuitry 908 may also include a transmit signal path which may include circuitry configured to amplify signals for transmission provided by the RF circuitry 906 for transmission by one or more of the one or more antennas 910. In various embodiments, the amplification through the transmit or receive signal paths may be done solely in the RF circuitry 906, solely in the FEM circuitry 908, or in both the RF circuitry 906 and the FEM circuitry 908.

In some embodiments, the FEM circuitry 908 may include a TX/RX switch to switch between transmit mode and receive mode operation. The FEM circuitry 908 may include a receive signal path and a transmit signal path. The receive signal path of the FEM circuitry 908 may include an LNA to amplify received RF signals and provide the amplified received RF signals as an output (e.g., to the RF circuitry 906). The transmit signal path of the FEM circuitry 908 may include a power amplifier (PA) to amplify input RF signals (e.g., provided by the RF circuitry 906), and one or more filters to generate RF signals for subsequent transmission (e.g., by one or more of the one or more antennas 910).

In some embodiments, the PMC 912 may manage power provided to the baseband circuitry 904. In particular, the PMC 912 may control power-source selection, voltage scaling, battery charging, or DC-to-DC conversion. The PMC 912 may often be included when the device 900 is capable of being powered by a battery, for example, when the device 900 is included in a UE. The PMC 912 may increase the power conversion efficiency while providing desirable implementation size and heat dissipation characteristics.

FIG. 9 shows the PMC 912 coupled only with the baseband circuitry 904. However, in other embodiments, the PMC 912 may be additionally or alternatively coupled with, and perform similar power management operations for, other components such as, but not limited to, the application circuitry 902, the RF circuitry 906, or the FEM circuitry 908.

In some embodiments, the PMC 912 may control, or otherwise be part of, various power saving mechanisms of the device 900. For example, if the device 900 is in an RRC_Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC_Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 10:
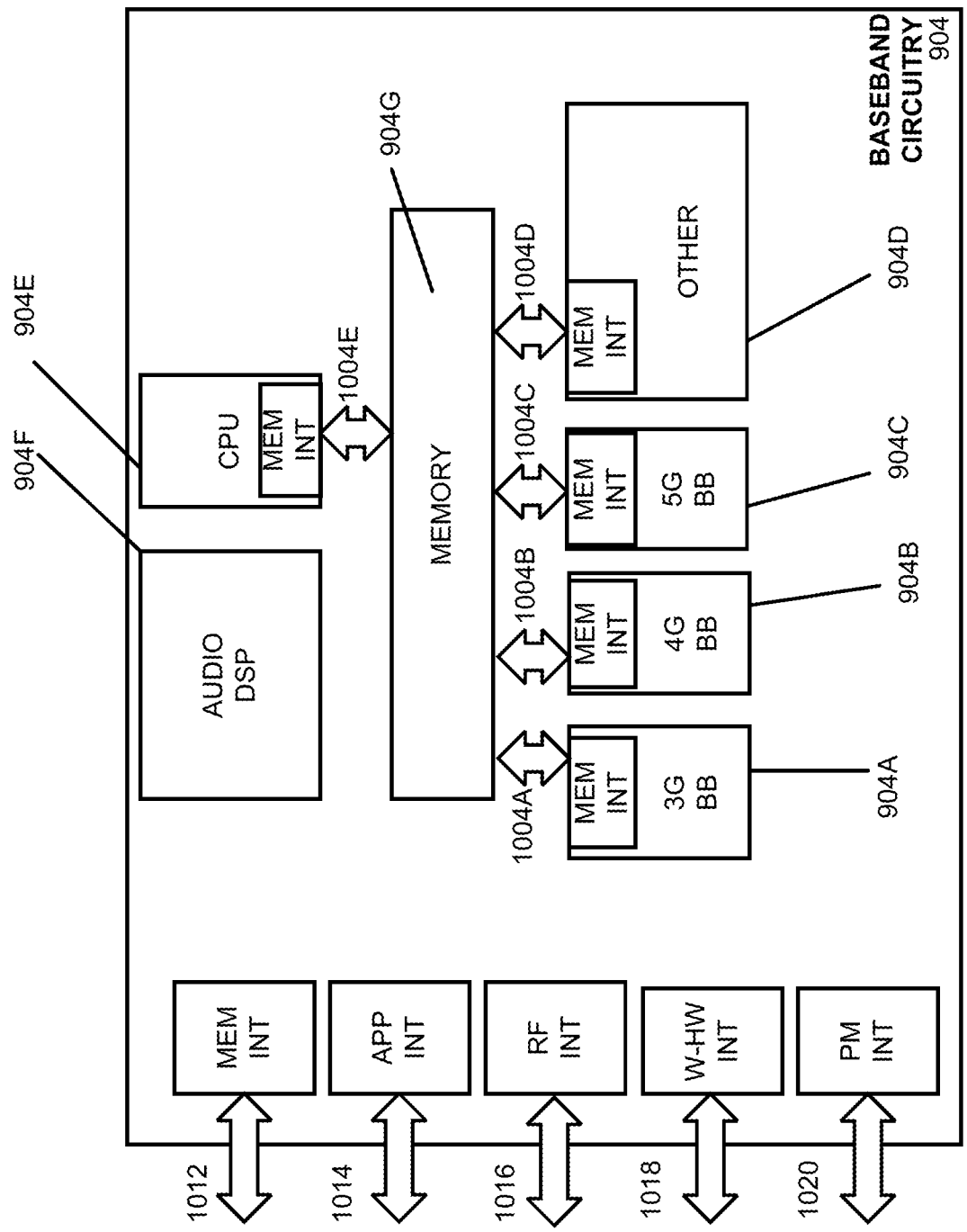
FIG. 10 illustrates example interfaces of baseband circuitry in accordance with some embodiments.

FIG. 10 illustrates example interfaces of baseband circuitry in accordance with some embodiments. As discussed above, the baseband circuitry 904 of FIG. 9 may comprise processors 904A-904E and a memory 904G utilized by said processors. Each of the processors 904A-904E may include a memory interface, 1004A-1004E, respectively, to send/receive data to/from the memory 904G.

The baseband circuitry 904 may further include one or more interfaces to communicatively couple to other circuitries/devices, such as a memory interface 1012 (e.g., an interface to send/receive data to/from memory external to the baseband circuitry 904), an application circuitry interface 1014 (e.g., an interface to send/receive data to/from the application circuitry 902 of FIG. 9), an RF circuitry interface 1016 (e.g., an interface to send/receive data to/from RF circuitry 906 of FIG. 9), a wireless hardware connectivity interface 1018 (e.g., an interface to send/receive data to/from Near Field Communication (NFC) components, Bluetooth® components (e.g., Bluetooth® Low Energy), Wi-Fi® components, and other communication components), and a power management interface 1020 (e.g., an interface to send/receive power or control signals to/from the PMC 912.

Figure 11:
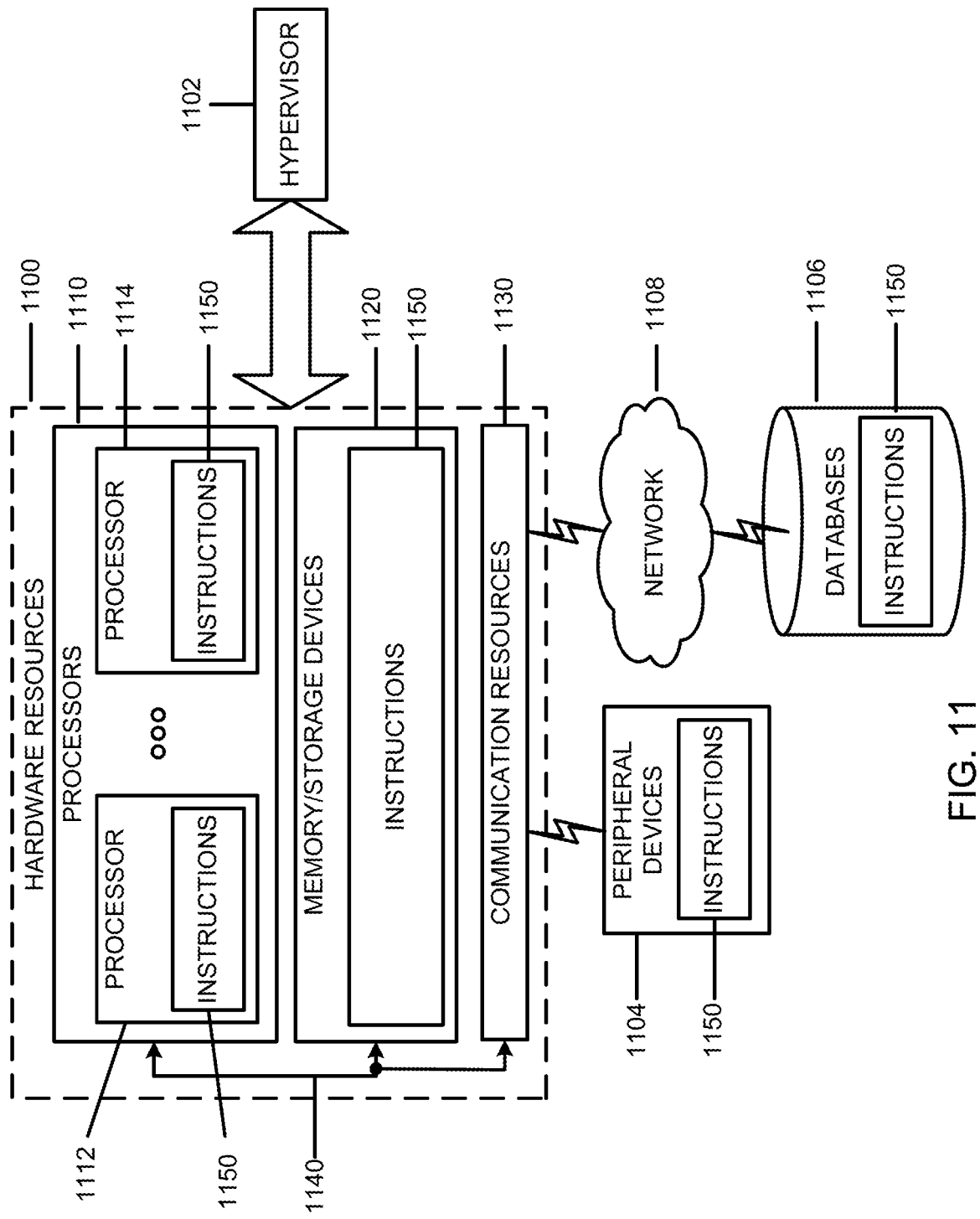
FIG. 11 is a block diagram illustrating components, according to some example embodiments, able to read instructions from a machine-readable or computer-readable medium and perform any one or more of the methodologies discussed herein.

FIG. 11 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1100 including one or more processors (or processor cores) 1110, one or more memory/storage devices 1120, and one or more communication resources 1130, each of which may be communicatively coupled via a bus 1140. For embodiments where node virtualization (e.g., NFV) is utilized, a hypervisor 1102 may be executed to provide an execution environment for one or more network slices/sub-slices to utilize the hardware resources 1100.

The processors 1110 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1112 and a processor 1114.

The memory/storage devices 1120 may include main memory, disk storage, or any suitable combination thereof. The memory/storage devices 1120 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1130 may include interconnection or network interface components or other suitable devices to communicate with one or more peripheral devices 1104 or one or more databases 1106 via a network 1108. For example, the communication resources 1130 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1150 may comprise software, a program, an application, an applet, an app, or other executable code for causing at least any of the processors 1110 to perform any one or more of the methodologies discussed herein. The instructions 1150 may reside, completely or partially, within at least one of the processors 1110 (e.g., within the processor's cache memory), the memory/storage devices 1120, or any suitable combination thereof. Furthermore, any portion of the instructions 1150 may be transferred to the hardware resources 1100 from any combination of the peripheral devices 1104 or the databases 1106. Accordingly, the memory of processors 1110, the memory/storage devices 1120, the peripheral devices 1104, and the databases 1106 are examples of computer-readable and machine-readable media.

In embodiments, the device or components of FIGS. 9-11, and particularly the baseband circuitry of FIG. 10, may be to identify or cause to identify a plurality of signals respectively from different serving cells. The device may be further to process or cause to process the plurality of received signals. The device may be further to identify or cause to identify, based on the processed plurality of received signals, TA adjustment delays respectively for a plurality of transmission time intervals from the different serving cells. The device may be further to determine or cause to determine a TA adjustment delay for the UE.

In other embodiments, the device or components may be to determine or cause to determine a TTI to transmit to a UE. The device may be further to transmit or cause to transmit the determined TTI to the UE.

In some embodiments, the electronic device(s), network(s), system(s), chip(s) or component(s), or portions or implementations thereof, of FIG. 7, 9, or some other figure herein may be configured to perform one or more processes, techniques, or methods as described herein, or portions thereof. One such process is depicted in FIG. 12, which is a flowchart of a method 1200 for a UE according to an example embodiment. For example, the process 1200 may include identifying 1202 or causing to identify a plurality of signals respectively from different serving cells. The process 1200 may further include processing 1204 or causing to process the plurality of received signals. The process 1200 may further include identifying 1206 or causing to identify, based on the processed plurality of received signals, time advance (TA) adjustment delays respectively for a plurality of transmission time intervals from the different serving cells. The process 1200 may further include determining 1208 or causing to determine a TA adjustment delay for the UE.

In some embodiments, the electronic device(s), network(s), system(s), chip(s) or component(s), or portions or implementations thereof, of FIG. 7, 9, or some other figure herein may be configured to perform one or more processes, techniques, or methods as described herein, or portions thereof. One such process is depicted in FIG. 13, which is a flowchart of a process 1300 for a RAN node according to an example embodiment. For example, the process 1300 may include determining 1302 or causing to determine a TTI to transmit to a UE. The process 1300 may further include transmitting 1304 or causing to transmit the determined TTI to the UE.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., which perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

G. Additional Examples

The following are additional examples, according to certain embodiments, which may be performed by the devices, networks, systems, chips, components, or portions thereof, shown in FIGS. 7-11.

Example 1 is an apparatus for a user equipment (UE). The apparatus includes a memory interface, measurement circuitry, and a baseband processor. The memory interface is to send or receive, to or from a memory device, reference signal measurement values corresponding to a plurality of reference signals. The measurement circuitry is to measure the plurality of reference signals to obtain the reference signal measurement values. The baseband processor is to: decode a network message comprising beamforming information corresponding to the plurality of reference signals; based on the beamforming information, selectively combine or average the reference signal measurement values of the respective plurality of reference signals; and use the selectively combined or averaged reference signal measurement values to communicate through a wireless communication network.

Example 2 is the apparatus of Example 1, wherein the beamforming information indicates whether or not the plurality of reference signals are beamformed, and wherein the baseband processor is further configured to: if the plurality of reference signals are not beamformed, combine or average each of the reference signal values of the plurality of reference signals; and if the plurality of reference signals are beamformed, combine or average only the reference signal measurement values corresponding to a subgroup of the plurality of reference signals comprising a same index among different synchronization signal burst set periodicity.

Example 3 is the apparatus of Example 1, wherein the beamforming information indicates which of the plurality of reference signals use a same transmit beamforming, and wherein the baseband processor is configured to combine or average the reference signal measurement values corresponding to the indicated plurality of reference signals that use the same transmit beamforming.

Example 4 is the apparatus of Example 3, wherein a first reference signal of the plurality of reference signals is part of an associated synchronization signal block (SSB) comprising an SSB index, wherein the beamforming information indicates that a second reference signal of the plurality of reference signals is quasi-colocated (QCL) with the associated SSB in spatial parameters, and wherein the baseband processor is configured to combine or average the reference signal measurement values corresponding to the first reference signal and the second reference signal.

Example 5 is the apparatus of Example 4, wherein the network message comprising the beamforming information comprises a radio resource control (RRC) message including an information element to configure channel-state information reference signal based radio resource management (RRM) measurements.

Example 6 is the apparatus of Example 4, wherein the SSB index identifies an SSB within a synchronization signal burst.

Example 7 is the apparatus of Example 1, wherein the beamforming information includes a frequency index to identify which of the plurality of reference signals use a same beamforming in a frequency domain.

Example 8 is the apparatus of Example 1, wherein the wherein the beamforming information includes a frequency index and a time index to identify which of the plurality of reference signals use a same beamforming in a frequency domain and a time domain.

Example 9 is the apparatus of any of Examples 7-8, wherein the frequency index comprises a frequency identifier corresponding to a synchronization signal block.

Example 10 is the apparatus of any of Examples 1-9, wherein to use the selectively combined or averaged reference signal measurement values to communicate through a wireless communication network comprises using the selectively combined or averaged reference signal measurement values to perform at least one of channel estimation, cell selection or reselection, cell search, and handover.

Example 11 is the apparatus of any of Examples 1-10, wherein the plurality of reference signals are selected from a group comprising a primary synchronization signal (PSS), a secondary synchronization signal (SSS), a physical broadcast channel (PBCH), a channel-state information reference signal (CSI-RS), and a demodulation reference signal (DMRS).

Example 12 is a computer-readable storage medium having computer-readable instructions stored thereon. The computer-readable instructions to, when executed, instruct a processor of a radio access network (RAN) node in a wireless network to: determine a synchronization signal block (SSB) index corresponding to a reference signal to transmit from the RAN node; determine whether or not resources for the reference signal are quasi-colocated with an associated SSB; encode a message, for one or more user equipment (UE), to indicate the SSB index and whether or not the resources for the reference signal are quasi-colocated with the associated SSB; and provide the message for transmission to the one or more UE.

Example 13 is the computer-readable storage medium in Example 12, wherein the instructions are further to determine whether or not the resources for the reference signal are quasi-colocated in spatial parameters.

Example 14 is the computer-readable storage medium in any of Examples 12-13, wherein the RAN node comprises a g Node B (gNB).

Example 15 is the computer-readable storage medium in any of Examples 12-15, wherein the message comprises an information element to configure channel-state information reference signal based radio resource management (RRM) measurements by the one or more UE.

Example 16 is the computer-readable storage medium in any of Examples 12-15, wherein the SSB index identifies an SSB within a synchronization signal burst.

Example 17 is an apparatus for a wireless network. The apparatus includes means to generate combining information corresponding to reference signals that may be combined or averaged by a user equipment (UE) within a cell of the wireless network, means to generate quasi-colocated information corresponding to reference signals that use a same transmit beamforming, means to encode a message comprising the combining information for at least one of identification and measurement; and means to provide the message to the UE.

Example 18 is the apparatus of Example 17, wherein the combining information comprises an indication of whether all or none of the reference signals can be combined or averaged for identification and measurement.

Example 19 is the apparatus of Example 17, wherein the combining information comprises an indication of which reference signals can be combined or averaged on time domain.

Example 20 is the apparatus of Example 17, wherein the combining information comprises an indication of which reference signals can be combined or averaged on frequency domain.

Example 21 is the apparatus of Example 17, wherein the combining information comprises an indication of which reference signals can be combined or averaged on both time domain and frequency domain.

Example 22 is the apparatus of any of Examples 17, 18, 19 or 21, wherein the combining information includes a time index.

Example 23 is the apparatus of any of Examples 17, 18, 20, or 21, wherein the combining information includes a frequency index.

Example 24 is the apparatus of Example 23, wherein the frequency index is associated with a synchronization signal (SS) block for a target cell in the wireless network, the frequency index included in one of a physical broadcast channel (PBCH) or a network assistance information (NAI) of the target cell.

Example 25 is the apparatus of Example 24, wherein the frequency index comprises a frequency identifier corresponding to a center frequency of the SS block.

Example 26 is the apparatus of Example 24, wherein the frequency index comprises an integer corresponding to a frequency position within the SS block.

Example 27 is the apparatus of any of Examples 17-26, wherein the reference signals are selected from a group comprising a primary synchronization signal (PSS), a secondary synchronization signal (SSS), a physical broadcast channel (PBCH), a channel-state information reference signal (CSI-RS), and a demodulation reference signal (DMRS).

It will be understood by those having skill in the art that many changes may be made to the details of the above-described embodiments without departing from the underlying principles of the invention. The scope of the present invention should, therefore, be determined only by the following claims.

The invention claimed is:

1. An apparatus for a user equipment (UE), the apparatus comprising:
a memory interface to send or receive, to or from a memory device, reference signal measurement values corresponding to a plurality of reference signals; and
a baseband processor coupled to the memory interface to:
decode a network message comprising beamforming information corresponding to the plurality of reference signals;
based on the beamforming information, selectively combine or average the reference signal measurement values of the respective plurality of reference signals; and
use the selectively combined or averaged reference signal measurement values to communicate through a wireless communication network.

2. The apparatus of claim 1, wherein the beamforming information indicates whether or not the plurality of reference signals are beamformed, and wherein the baseband processor is further configured to:
if the plurality of reference signals are not beamformed, combine or average each of the reference signal values of the plurality of reference signals; and
if the plurality of reference signals are beamformed, combine or average only the reference signal measurement values corresponding to a subgroup of the plurality of reference signals comprising a same index among different synchronization signal burst set periodicity.

3. The apparatus of claim 1, wherein the beamforming information indicates which of the plurality of reference signals use a same transmit beamforming, and wherein the baseband processor is configured to combine or average the reference signal measurement values corresponding to the indicated plurality of reference signals that use the same transmit beamforming.

4. The apparatus of claim 3, wherein a first reference signal of the plurality of reference signals is part of an associated synchronization signal block (SSB) comprising an SSB index, wherein the beamforming information indicates that a second reference signal of the plurality of reference signals is quasi-colocated (QCL) with the associated SSB in spatial parameters, and wherein the baseband processor is configured to combine or average the reference signal measurement values corresponding to the first reference signal and the second reference signal.

5. The apparatus of claim 4, wherein the network message comprising the beamforming information comprises a radio resource control (RRC) message including an information element to configure channel-state information reference signal based radio resource management (RRM) measurements.

6. The apparatus of claim 4, wherein the SSB index identifies an SSB within a synchronization signal burst.

7. The apparatus of claim 1, wherein the beamforming information includes a frequency index to identify which of the plurality of reference signals use a same beamforming in a frequency domain.

8. The apparatus of claim 7, wherein the frequency index comprises a frequency identifier corresponding to a synchronization signal block.

9. The apparatus of claim 1, wherein the beamforming information includes a frequency index and a time index to identify which of the plurality of reference signals use a same beamforming in a frequency domain and a time domain.

10. The apparatus of claim 1, wherein to use the selectively combined or averaged reference signal measurement values to communicate through a wireless communication network comprises using the selectively combined or averaged reference signal measurement values to perform at least one of channel estimation, cell selection or reselection, cell search, and handover.

11. The apparatus of claim 1, wherein the plurality of reference signals are selected from a group comprising a primary synchronization signal (PSS), a secondary synchronization signal (SSS), a physical broadcast channel (PBCH), a channel-state information reference signal (CSI-RS), and a demodulation reference signal (DMRS).

12. A non-transitory computer-readable storage medium having computer-readable instructions stored thereon, the computer-readable instructions to, when executed, instruct a processor of a radio access network (RAN) node in a wireless network to:
    determine a synchronization signal block (SSB) index corresponding to a reference signal to transmit from the RAN node;
    determine whether or not resources for the reference signal are quasi-colocated in spatial parameters;
    encode a message, for one or more user equipment (UE), to indicate the SSB index and whether or not the resources for the reference signal are quasi-colocated with an associated SSB; and
    provide the message for transmission to the one or more UE.

13. The non-transitory computer-readable storage medium in claim 12, wherein the RAN node comprises a g Node B (gNB).

14. The non-transitory computer-readable storage medium in claim 12, wherein the message comprises an information element to configure channel-state information reference signal based radio resource management (RRM) measurements by the one or more UE.

15. The non-transitory computer-readable storage medium in claim 12, wherein the SSB index identifies an SSB within a synchronization signal burst.

16. An apparatus for a wireless network, the apparatus comprising:
    means to generate combining information corresponding to reference signals that may be combined or averaged by a user equipment (UE) within a cell of the wireless network;
    means to generate quasi-colocated information corresponding to reference signals that use a same transmit beamforming;
    means to encode a message comprising the combining information for at least one of identification and measurement; and
    means to provide the message to the UE.

17. The apparatus of claim 16, wherein the combining information comprises an indication of whether all or none of the reference signals can be combined or averaged for identification and measurement.

18. The apparatus of claim 16, wherein the combining information comprises an indication of which reference signals can be combined or averaged on time domain.

19. The apparatus of claim 16, wherein the combining information comprises an indication of which reference signals can be combined or averaged on frequency domain.

20. The apparatus of claim 16, wherein the combining information comprises an indication of which reference signals can be combined or averaged on both time domain and frequency domain.

21. The apparatus of claim 16, wherein the combining information includes a time index.

22. The apparatus of claim 16, wherein the combining information includes a frequency index.

23. The apparatus of claim 22, wherein the frequency index is associated with a synchronization signal (SS) block for a target cell in the wireless network, the frequency index included in one of a physical broadcast channel (PBCH) or a network assistance information (NAI) of the target cell.

24. The apparatus of claim 23, wherein the frequency index comprises a frequency identifier corresponding to a center frequency of the SS block.

25. The apparatus of claim 23, wherein the frequency index comprises an integer corresponding to a frequency position within the SS block.

26. The apparatus of claim 16, wherein the reference signals are selected from a group comprising a primary synchronization signal (PSS), a secondary synchronization signal (SSS), a physical broadcast channel (PBCH), a channel-state information reference signal (CSI-RS), and a demodulation reference signal (DMRS).

* * * * *